L. P. BRADDY.
SAFETY DEVICE.
APPLICATION FILED APR. 14, 1920.
1,383,786.
Patented July 5, 1921.
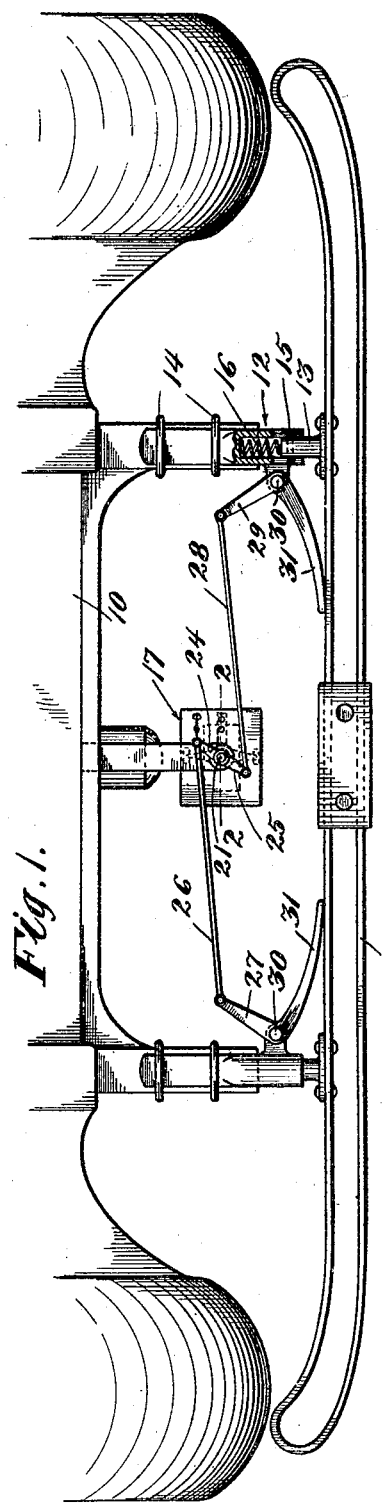
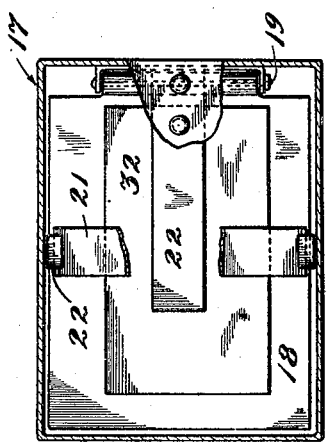
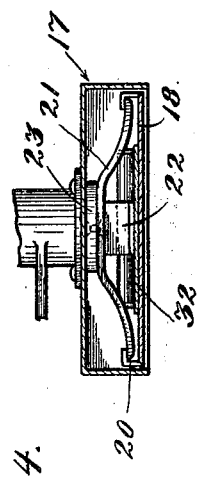
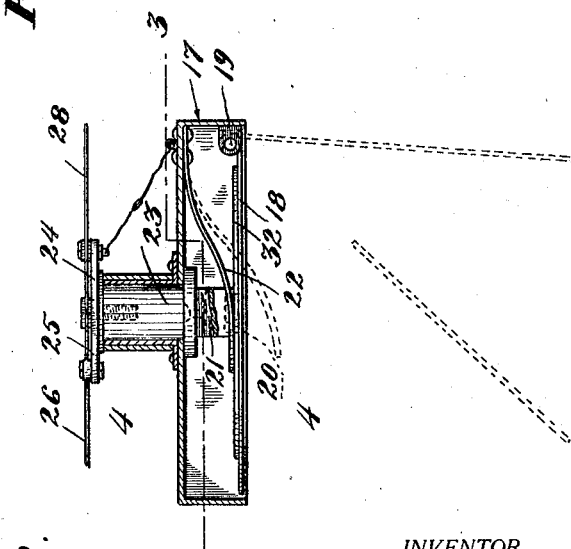
INVENTOR
L. P. Braddy.
BY
Chas. E. Townsend
ATTORNEY.

UNITED STATES PATENT OFFICE.

LEWIS P. BRADDY, OF SAN FRANCISCO, CALIFORNIA.

SAFETY DEVICE.

1,383,786.　　　　Specification of Letters Patent.　　Patented July 5, 1921.

Application filed April 14, 1920. Serial No. 373,943.

*To all whom it may concern:*

Be it known that I, LEWIS P. BRADDY, a citizen of the United States, residing at city and county of San Francisco and State of California, have invented a new and useful Improvement in Safety Devices, of which the following is a specification.

This invention relates to a safety device for automobiles.

It is the principal object of the present invention to provide a device adapted to be actuated upon the impact of an automobile with a person or some other object and to automatically release an identification card so that in the event that the driver of the automobile does not stop the car may be easily identified.

The present invention contemplates the use of a card carrier adapted to be sealed and which carrier is operatively connected to the bumper so that excessive impact against the bumper will automatically break the seal of the card case and cause the card to drop therefrom.

The invention is illustrated by way of example in the accompanying drawings, in which:

Figure 1 is a fragmentary view in plan showing the fore part of an automobile to which the present invention is applied.

Fig. 2 is a view in section through the card carrier of the present invention as seen on the line 2—2 of Fig. 1.

Fig. 3 is a view in section through the card carrier as seen on the line 3—3 of Fig. 2.

Fig. 4 is a transverse view showing the locking mechanism of the card carrier as shown on the line 4—4 of Fig. 2.

Referring more particularly to the drawings, 10 indicates an automobile body to the front of which a fender or a bumper 11 is secured. This device may be of any desired construction and is here shown as equipped with a special mounting comprising horizontally extending brackets 12 into which mounting pins 13 may project. The pins 13 are rigidly secured to the back of the bumper and are intended to extend into a longitudinal bore of the brackets 12. These brackets are preferably secured to the ends of the frame horns by means of bolts 14. Longitudinal slots are formed in the side walls of the brackets 12 and receive transverse pins 15 secured through the mounting pins 13 and thereby limiting the movement of the bumper relative to the main frame. Helical compression springs 16 are mounted within the longitudinal bores of the brackets and resist the rearward movement of the pins 13 and the bumper. Secured to the transverse portion of the main frame and at a point preferably midway of the horns thereof is a card case 17. This case is preferably rectangular in shape and has a bottom door 18 adapted to swing downwardly around a hinge pin 19. The door is normally locked by means of locking flanges 20 formed along the opposite sides of the door and more clearly shown in Fig. 4 of the drawings. The lock flanges 20 are engaged by a rotating lock bolt 21 having fingers which normally rest beneath the flanges and hold the door in its uppermost position. This action is normally resisted, however, by a frame spring 22 which bears down against the door and tends to throw it open. The release of the door may be brought about by rotation of a lock shaft 23 to which the lock bolt 21 is fixed. This shaft extends vertically and is fitted with lever arms 24 and 25. The lever arm 24 is connected with a rod 26 leading to one arm of a bell crank 27. The lever arm 25 is connected with a rod 28 leading to one arm of a bell crank 29. These bell cranks are mounted upon vertical pivot pins 30 supported from the sides of the brackets 12. The opposite free ends of the bell cranks are formed in the shape of fingers 31 which rest against the rear face of the bumper. This is provided so that rearward movement of the bumper against the expansion of springs 16 will cause rearward swinging movement of the bell cranks 27 and this in turn is intended to rotate the lock bolt 21 to release the door. An identification card 32 is secured by the compression of the spring 22 against the back of the door 18 and will be released therefrom when the door swings to its lowermost position.

In operation of the present invention it is contemplated to obtain legislation whereby compulsory use of the device is required. This will also make it necessary for proper authorized persons to issue identification cards suitable for use. These cards are then placed within the card case and the door set in its locked position. The springs 16 are intended to be of sufficient strength to be immovable against ordinary shock and to be only sensitive to excessive impact, at which time the bumper will be moved rearwardly and will operate the mechanism to rotate the lock bar 21 and permit the door 18 to drop. When the door drops it will remain a visible signal to the public that the driver of the car has been in an accident and has not reported the same to proper authorities from whom he could obtain a new identification card.

It will thus be seen that the device here disclosed will directly operate to insure that parties to an automobile collision may be identified, all of which operation is brought about by a simple mechanism not liable to require repair and which will positively act.

While I have shown the preferred form of my invention as now known to me, it will be understood that various changes in the combination, construction and arrangement of parts may be made by those skilled in the art without departing from the spirit of the invention as claimed.

Having thus described my invention, what I claim and desire to secure by Letters Patent, is:

1. The combination in a device of the character described of an automobile license or identifying card holder comprising a box having a hinged downwardly opening bottom, with inwardly turned hooks, a revoluble bolt vertical to the bottom with elastic arms engageable with said hooks, and means operable by collision contact, to turn the bolt and its arms, and cause the bottom to open and allow the card to drop.

2. In combination with an automobile, carrying a yieldable bumper, an identification card holder comprising in combination a box having a false bottom, means for holding said bottom in its closed position, an identification card supported by said bottom, a leaf spring having one end secured to the top of the box and its free end resting upon the identification card and connecting means between said holding means and bumper whereby upon collision the false bottom will be released and the card allowed to drop.

3. In combination with an automobile carrying a yieldable bumper forwardly thereof, an identification card holder comprising in combination a box having a false bottom, a spring for normally holding said bottom open, means for holding said bottom in its closed position, an identification card supported by said bottom, and connecting means between said holding means and bumper whereby upon collision the false bottom will be opened and the card allowed to drop.

4. In combination with an automobile carrying a yieldable bumper, an identification card holder comprising in combination a box having a hinged bottom, a spring secured to the box, adapted to normally hold said bottom open, a rotatable bolt in the upper part of a box carrying fingers adapted to engage up-turned flanges on the bottom and hold said bottom closed when rotated to a predetermined position, an identification card supported by said bottom, and means between said bolt and bumper whereby the bolt will be rotated to permit the bottom of box to open and allow the card to fall upon depression of the bumper.

5. In combination with an automobile carrying a yieldable bumper, an identification card holder comprising in combination a box having a hinged bottom, a spring secured to the box, adapted to normally hold said bottom open, a rotatable bolt in the upper part of a box carrying fingers adapted to engage up-turned flanges on the bottom and hold said bottom closed when rotated to a predetermined position, an identification card supported by said bottom, and a push rod and lever mechanism between said bolt and bumper adapted to rotate the bolt upon the depression of the bumper to a position for unlocking the bottom of the box and thus permitting the same to open and allow the identification card to fall.

LEWIS P. BRADDY.

Witnesses:
 JOHN H. HERRING,
 W. W. HEALEY.